(No Model.)
S. BROADBENT.
CAR WHEEL.
No. 303,700. Patented Aug. 19, 1884.
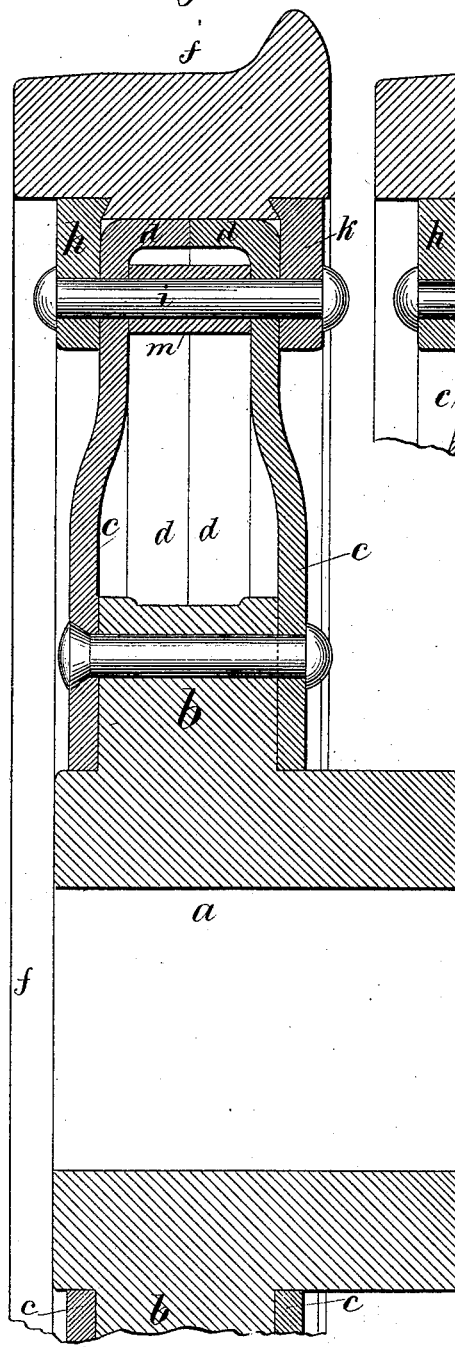
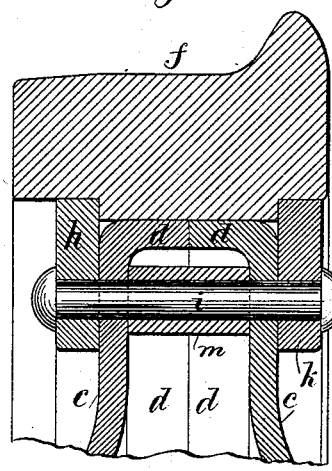
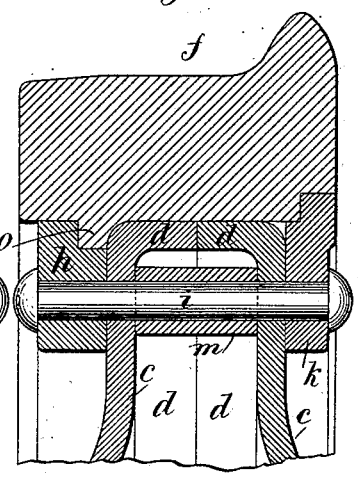
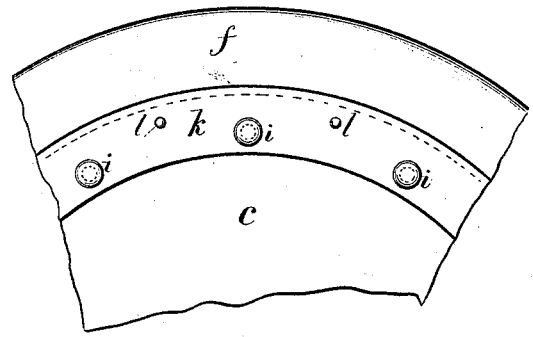
Inventor
Sidney Broadbent
per Lemuel W. Serrell
atty.
Witnesses
Chas. H. Smith
J. Staib

UNITED STATES PATENT OFFICE.

SIDNEY BROADBENT, OF SCRANTON, PENNSYLVANIA.

CAR-WHEEL.

SPECIFICATION forming part of Letters Patent No. 303,700, dated August 19, 1884.

Application filed April 21, 1884. (No model.)

*To all whom it may concern:*

Be it known that I, SIDNEY BROADBENT, of Scranton, in the State of Pennsylvania, have invented an Improvement in Metallic Car-Wheels, of which the following is a specification.

Car-wheels have been made in which the tire is of wrought-iron or steel and the hub of cast-iron, the intervening space being fitted with disks, the edges of which support the tire and are held in place by rings or sectional rings. The separate parts of this wheel, therefore, are not new or claimed by me.

I combine with the hub and tire disks that have inwardly-turned flanges upon their edges abutting against each other and forming broad bearings for the inner surface of the tire, and I fasten the disks and tire together by rings, the edges of which pass against shoulders or offsets in the tire of larger diameter than the disks. These parts are firmly secured together by rivets, and the wheel is easily and accurately made, and very strong and slightly elastic, and the tire is confined in such a manner that it cannot escape, even if it should crack open. I prefer to make the wheel of steel, but it may be of wrought-iron or partially of steel.

In the drawings, Figure 1 is a section of said wheel. Fig. 2 is a partial elevation. Figs. 3 and 4 are sections of the wheel with rings and shoulders of different forms.

The hub $a$ is made with a central flange, $b$, and at the sides of this there are the disks $c$ $c$, having at their edges inward flanges $d$ $d$, abutting edge to edge, and turned off upon the outer surfaces for the reception of the tire $f$. This tire may be of wrought-iron, but I prefer to make the same of steel. These parts have before been made, but the connection between the disks $c$ and the tire $f$ has usually been by sectional rings, that are expensive to make and difficult to fit so as to take a proper bearing.

I make use of the rings $h$ $k$ to secure the tire and the disks together, the bolts or rivets $i$ passing through both the rings and disks. The rings are of greater diameter than the disks, and the interior surface of the tire is turned off, with cylindrical offsets at the outer portions of the inner surface, forming shoulders for receiving the edges of these rings. I prefer to make the shoulders undercut or dovetailed, as seen in Fig. 1, the edges of the rings $h$ $k$ being trapezoidal in section to fit these undercut shoulders, so that the dovetailed portion of the tire is confined between the two flanges $h$ $k$, and the connection is of the most firm and reliable character. The rings $h$ $k$ may fit into square shoulders around within the tire, as in Fig. 2, or there may be a rib, as at $o$, Fig. 3, and a corresponding peripheral groove in the ring $h$, as seen in Fig. 4. The parts of this wheel are preferably pressed together by a powerful force—such as a hydraulic press—and the rivets $i$ bind the rings and disks together in a very reliable manner. In constructing this wheel it is preferable to rivet the ring $k$ to the disk $c$ by small rivets $l$, so that the parts can be turned up together. The tubular stays $m$ around the rivets $i$ can be held in place by temporary pins or bolts while the disks are being forced into place in the tire, after which such temporary bolts or pins can be removed successively and rivets inserted and headed up.

I claim as my invention—

1. The combination, with the hub $a$ and the flanged disks $c$ $c$, of the tire $f$, having cylindrical offsets at the outer portions of the inner surface, forming shoulders, the rings $h$ $k$ fitting into such shoulders, and the rivets or bolts connecting the parts, substantially as set forth.

2. The combination, with the hub and disks $c$, having inwardly-turned flanges, of a tire, $f$, having cylindrical offsets at the outer portions of the inner surface and undercut shoulders, and the dovetail rings fitting such shoulders, and the rivets or bolts $i$, connecting the respective parts, substantially as set forth.

Signed by me this 12th day of April, A. D. 1884.

SIDNEY BROADBENT.

Witnesses:
JAS. H. TORREY,
M. POORE.